(12) United States Patent
Hillebrand et al.

(10) Patent No.: US 10,499,040 B2
(45) Date of Patent: *Dec. 3, 2019

(54) DEVICE AND METHOD FOR OPTICALLY SCANNING AND MEASURING AN ENVIRONMENT AND A METHOD OF CONTROL

(71) Applicant: FARO Technologies, Inc., Lake Mary, FL (US)

(72) Inventors: Gerrit Hillebrand, Waiblingen (DE); Rasmus Debitsch, Fellbach (DE); Rolf Heidemann, Stuttgart (DE); Martin Ossig, Tamm (DE); Johannes Buback, Korntal-Munchingen (DE)

(73) Assignee: FARO TECHNOLOGIES, INC., Lake Mary, FL (US)

( * ) Notice: Subject to any disclaimer, the term of this patent is extended or adjusted under 35 U.S.C. 154(b) by 27 days.

This patent is subject to a terminal disclaimer.

(21) Appl. No.: 15/664,339

(22) Filed: Jul. 31, 2017

(65) Prior Publication Data

US 2017/0332069 A1 Nov. 16, 2017

Related U.S. Application Data

(63) Continuation of application No. 14/722,219, filed on May 27, 2015, now Pat. No. 9,769,463.
(Continued)

(30) Foreign Application Priority Data

Sep. 10, 2014 (DE) .................. 10 2014 013 678

(51) Int. Cl.
*H04N 13/296* (2018.01)
*H04N 13/243* (2018.01)
(Continued)

(52) U.S. Cl.
CPC ....... *H04N 13/296* (2018.05); *G01B 11/2545* (2013.01); *G06T 7/55* (2017.01);
(Continued)

(58) Field of Classification Search
CPC ............... H04N 13/296; H04N 13/243; H04N 5/23293; H04N 5/772; G01B 11/2545;
(Continued)

(56) References Cited

U.S. PATENT DOCUMENTS 6,215,498 B1 4/2001 Filo et al.
6,826,299 B2 11/2004 Brown et al.
(Continued)

FOREIGN PATENT DOCUMENTS

AT 506110 A1 6/2009
DE 2950138 A1 6/1981
(Continued)

OTHER PUBLICATIONS

Creaform, "Creaform Releases Completely Re-Engineered Handyscan 3D Portable Scanners", May 5, 2014, 1 page.
(Continued)

*Primary Examiner* — Allen C Wong
(74) *Attorney, Agent, or Firm* — Cantor Colburn LLP

(57) ABSTRACT

A device and method for scanning and measuring an environment is provided. The method includes providing a three-dimensional (3D) measurement device having a controller. Images of the environment are recorded and a 3D scan of the environment is produced with a three-dimensional point cloud. A first movement of the 3D measurement device is determined and then an operating parameter of the 3D measurement device is changed based at least in part on the first movement.

19 Claims, 8 Drawing Sheets

Related U.S. Application Data

(60) Provisional application No. 62/161,461, filed on May 14, 2015.

(51) Int. Cl.

| | | |
|---|---|---|
| *H04N 5/232* | (2006.01) | |
| *H04N 5/77* | (2006.01) | |
| *G01B 11/25* | (2006.01) | |
| *G06T 7/55* | (2017.01) | |
| *G09G 5/00* | (2006.01) | |
| *G09G 5/02* | (2006.01) | |

(52) U.S. Cl.
CPC ......... *H04N 5/23293* (2013.01); *H04N 5/772* (2013.01); *H04N 13/243* (2018.05); *G06T 2200/24* (2013.01); *G06T 2207/10016* (2013.01); *G06T 2207/10028* (2013.01); *G09G 5/00* (2013.01); *G09G 5/02* (2013.01); *G09G 2340/12* (2013.01); *G09G 2340/14* (2013.01)

(58) Field of Classification Search
CPC ............ G06T 7/55; G06T 2200/24; G06T 2207/10016; G06T 2207/10028; G09G 2340/12; G09G 2340/14; G09G 5/00; G09G 5/02
USPC .......................................................... 348/46
See application file for complete search history.

(56) References Cited

U.S. PATENT DOCUMENTS

| | | |
|---|---|---|
| 7,259,747 B2 | 8/2007 | Bell |
| 8,238,611 B2 | 8/2012 | Hilaire et al. |
| 8,355,041 B2 | 1/2013 | Chen et al. |
| 8,937,657 B2 * | 1/2015 | Klass ............... G01B 11/254 348/136 |
| 9,196,067 B1 | 11/2015 | Freed |
| 9,217,637 B2 | 12/2015 | Heidemann et al. |
| 9,242,171 B2 | 1/2016 | Newcombe et al. |
| 9,372,265 B2 | 6/2016 | Zweigle et al. |
| 9,383,587 B2 | 7/2016 | Balogh |
| 9,602,811 B2 | 3/2017 | Hillebrand et al. |
| 9,671,221 B2 | 6/2017 | Ruhland et al. |
| 9,693,040 B2 | 6/2017 | Hillebrand et al. |
| 10,070,116 B2 | 9/2018 | Hillebrand et al. |
| 2002/0015934 A1 | 2/2002 | Rubbert et al. |
| 2007/0097381 A1 | 5/2007 | Tobiason et al. |
| 2007/0171220 A1 | 7/2007 | Kriveshko |
| 2007/0172112 A1 | 7/2007 | Paley et al. |
| 2008/0201101 A1 | 8/2008 | Hebert et al. |
| 2010/0034426 A1 | 2/2010 | Takiguchi et al. |
| 2010/0074609 A1 | 3/2010 | Kasama et al. |
| 2010/0095542 A1 | 4/2010 | Ferrari |
| 2010/0134598 A1 | 6/2010 | St-Pierre et al. |
| 2010/0134599 A1 | 6/2010 | Billert et al. |
| 2010/0259636 A1 | 10/2010 | Tzur et al. |
| 2011/0107611 A1 | 5/2011 | Desforges et al. |
| 2011/0134225 A1 | 6/2011 | Saint-Pierre et al. |
| 2011/0164037 A1 | 7/2011 | Yoshida et al. |
| 2011/0181553 A1 | 7/2011 | Brown et al. |
| 2011/0188739 A1 | 8/2011 | Lee et al. |
| 2011/0260033 A1 | 10/2011 | Steffensen et al. |
| 2012/0033069 A1 | 2/2012 | Becker et al. |
| 2012/0044249 A1 * | 2/2012 | Mashitani ............ H04N 13/296 345/419 |
| 2012/0062557 A1 | 3/2012 | Dillon et al. |
| 2012/0092461 A1 | 4/2012 | Fisker et al. |
| 2012/0236288 A1 | 9/2012 | Stanley |
| 2012/0327083 A1 | 12/2012 | Nishimura et al. |
| 2013/0155058 A1 | 6/2013 | Golparvar-Fard et al. |
| 2013/0214122 A1 | 8/2013 | Steffensen et al. |
| 2013/0218024 A1 | 8/2013 | Boctor et al. |
| 2013/0242054 A1 * | 9/2013 | Chiu ................ G06T 17/00 348/46 |
| 2013/0335417 A1 | 12/2013 | McQueston et al. |
| 2014/0015963 A1 | 1/2014 | Klaas |
| 2014/0028805 A1 | 1/2014 | Tohme |
| 2014/0120493 A1 | 5/2014 | Levin |
| 2014/0168370 A1 | 6/2014 | Heidemann et al. |
| 2014/0267623 A1 | 9/2014 | Bridges et al. |
| 2014/0268108 A1 | 9/2014 | Grau |
| 2015/0015701 A1 | 1/2015 | Yu |
| 2015/0016712 A1 * | 1/2015 | Rhoads ............ G06K 9/00208 382/154 |
| 2015/0084951 A1 * | 3/2015 | Boivin ................ H04N 5/272 345/419 |
| 2015/0227644 A1 * | 8/2015 | Schultz .............. G06F 17/5004 703/1 |
| 2015/0229907 A1 | 8/2015 | Bridges |
| 2015/0373321 A1 | 12/2015 | Bridges |
| 2016/0069670 A1 | 3/2016 | Ruhland et al. |
| 2016/0073085 A1 | 3/2016 | Hillebrand et al. |
| 2016/0073091 A1 | 3/2016 | Hillebrand et al. |
| 2016/0073104 A1 | 3/2016 | Hillebrand et al. |
| 2016/0291160 A1 | 10/2016 | Zweigle et al. |
| 2018/0135965 A1 | 5/2018 | Hillebrand |
| 2018/0164090 A1 | 6/2018 | Hillebrand et al. |

FOREIGN PATENT DOCUMENTS

| | | |
|---|---|---|
| DE | 19502459 A1 | 8/1996 |
| DE | 19637682 A1 | 3/1998 |
| DE | 10149750 A1 | 9/2002 |
| DE | 10219054 A1 | 11/2003 |
| DE | 10313223 A1 | 10/2004 |
| DE | 102007022361 A1 | 11/2008 |
| DE | 202012104890 U1 | 3/2011 |
| DE | 102010017857 A1 | 10/2011 |
| DE | 102011119012 A1 | 5/2013 |
| DE | 102012112322 A1 | 6/2014 |
| DE | 102014205640 A1 | 10/2015 |
| EP | 1882895 A1 | 1/2008 |
| EP | 2048557 B1 | 4/2009 |
| EP | 2428764 A1 | 3/2012 |
| EP | 2620914 A2 | 7/2013 |
| EP | 2693300 A2 | 2/2014 |
| EP | 2728306 A1 | 5/2014 |
| EP | 2976600 A1 | 1/2016 |
| JP | H06194137 A | 7/1994 |
| JP | 2002222007 A | 8/2002 |
| JP | 2013232208 A | 8/2002 |
| JP | 2009063582 A | 3/2009 |
| JP | 2010096752 A | 4/2010 |
| JP | 2012055695 A | 3/2012 |
| JP | 2012088876 A | 5/2012 |
| JP | 2012178854 A | 9/2012 |
| JP | 2013254409 A | 12/2013 |
| JP | 2014081279 A | 5/2014 |
| JP | 2014134383 a | 7/2014 |
| WO | 2005103863 US | 11/2005 |
| WO | 2009003225 A1 | 1/2009 |
| WO | 2010015086 A1 | 2/2010 |
| WO | 2012079013 A1 | 6/2012 |
| WO | 2012168322 A2 | 12/2012 |
| WO | 2013106291 A1 | 7/2013 |
| WO | 2013184340 A1 | 12/2013 |
| WO | 2013186160 A1 | 12/2013 |
| WO | 2014153430 A1 | 9/2014 |

OTHER PUBLICATIONS

German Office Action re Application No. 10 2014 013 678.7 dated Oct. 14, 2014, 5 pages.

Hebert, P., "A Self-Referenced Hand-Held Range Sensor" Proceedings Third International Conference on 3-D Digital Imaging and Modeling, Quebec City, Que., 2001, pp. 5-12.

Mahdy, Yousef B., et al; "Projector Calibration Using Passive Stereo and Triangulation"; International Journal of Future Computer and Communication; vol. 2; No. 5; 385-390; Oct. 2013; 6 pgs.

International Search Report and Written Opinion of the International Searching Authority for International Application No. PCT/

(56) References Cited

OTHER PUBLICATIONS

US2015/041992 dated Sep. 30, 2015; dated Oct. 12, 2015; 7 pages.
Creaform Metrology Solutions, "Handy Scan 3D—The Truly Portable Metrology-Grade 3D Scanners" brochure, Apr. 26, 2014; 7 pages.

* cited by examiner

DEVICE AND METHOD FOR OPTICALLY SCANNING AND MEASURING AN ENVIRONMENT AND A METHOD OF CONTROL

CROSS REFERENCE TO RELATED APPLICATIONS

The present application is a continuation application of U.S. patent application Ser. No. 14/722,219 filed on May 27, 2015, which claims the benefit of German Patent Application 10 2014 013 678.7 filed on Sep. 10, 2014 and to U.S. Provisional Application Ser. No. 62/161,461 filed on May 14, 2015, the contents of both of which are incorporated herein by reference.

BACKGROUND

The subject matter disclosed herein relates to a portable scanner, and in particular to a portable scanner having a display.

A portable scanner includes a projector that projects light patterns on the surface of an object to be scanned. The position of the projector is determined by means of a projected, encoded pattern. Two (or more) cameras, the relative positions and alignment of which are known or are determined, can record images of the surface with a further, uncoded pattern. The three-dimensional coordinates (of the points of the pattern) can be determined by means of mathematical methods which are known per se, such as epipolar geometry.

In video gaming applications, scanners are known as tracking devices, in which a projector projects an encoded light pattern onto the target to be pursued, preferably the user who is playing, in order to then record this encoded light pattern with a camera and to determine the coordinates of the user. The data are represented on an appropriate display.

A system for scanning a scene, including distance measuring, may include, in its most simplest form, a camera unit with two cameras, and illumination unit and a synchronizing unit. The cameras, which may optionally include filters, are used for the stereoscopic registration of a target area. The illumination unit is used for generating a pattern in the target area, such as by means of a diffractive optical element. The synchronizing unit synchronizes the illumination unit and the camera unit. Camera unit and illumination unit can be set up in selectable relative positions. Optionally, also two camera units or two illumination units can be used.

BRIEF DESCRIPTION

According to one aspect of the invention, a method for optically scanning and measuring an environment of a handheld scanner is provided. The method includes recording images of the environment with cameras included in the handheld scanner, the images including a video image of the environment recorded with a first of the cameras. A control and evaluation device processes data provided by the handheld scanner to obtain a three-dimensional (3D) point cloud. The video image and the 3D point cloud are represented on a display of the control and evaluation device, the representation of at least one of the video image and 3D point cloud being determined by one of a speed or an acceleration of the handheld scanner. In the step of representing the video image on a display of the control and evaluation device, a scale of the representation of the video image is determined by at least one of the speed or the acceleration of the handheld scanner, the scale being a ratio of a size of the representation of the video image to a size of the display. Wherein the scale of the representation of the video image is smaller for a first speed movement of the handheld scanner than for a second speed movement of the handheld scanner, the first speed being larger than the second speed. The resulting image is displayed.

According to another aspect of the invention, a method for optically scanning and measuring an environment of a handheld scanner is provided. The method includes recording images of the environment with cameras included in the handheld scanner, the images including a video image of the environment recorded with a first of the cameras. A control and evaluation device processes data provided by the handheld scanner to obtain a three-dimensional (3D) point cloud. The video image and the 3D point cloud are represented on a display of the control and evaluation device. A direction of gravity is defined by moving the handheld scanner.

According to yet another aspect of the invention, a method for optically scanning and measuring an environment of a handheld scanner is provided. The method includes recording images of the environment with cameras included in the handheld scanner, the images including a video image of the environment recorded with a first of the cameras. A control and evaluation device processes data provided by the handheld scanner to obtain a three-dimensional (3D) point cloud. The video image and the 3D point cloud are represented on a display of the control and evaluation device. The handheld scanner is moved along a path. A scene is determined from the path.

These and other advantages and features will become more apparent from the following description taken in conjunction with the drawings.

BRIEF DESCRIPTION OF THE DRAWINGS

The subject matter, which is regarded as the invention, is particularly pointed out and distinctly claimed in the claims at the conclusion of the specification. The foregoing and other features, and advantages of the invention are apparent from the following detailed description taken in conjunction with the accompanying drawings in which:

Figure 1:
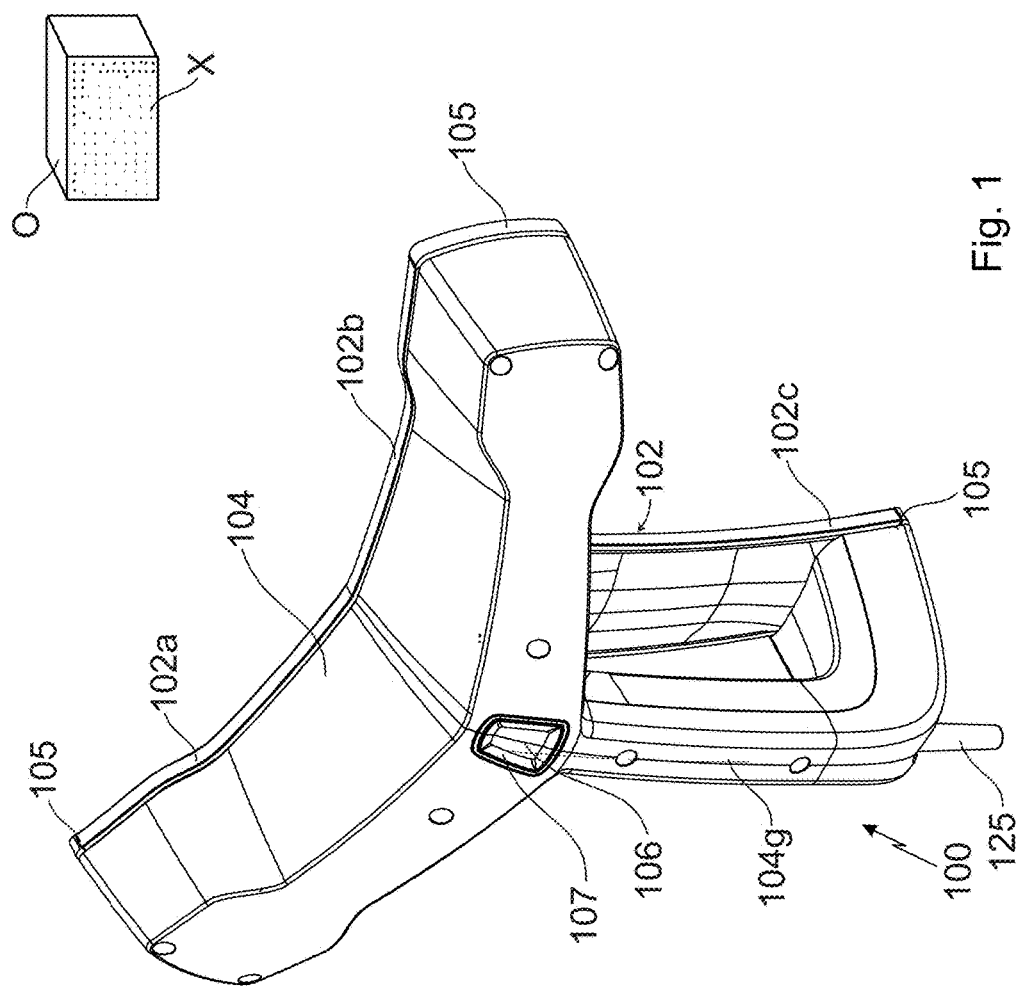
FIG. 1 shows a perspective view of a hand-held scanner and of an object in the environment.
Figure 2:
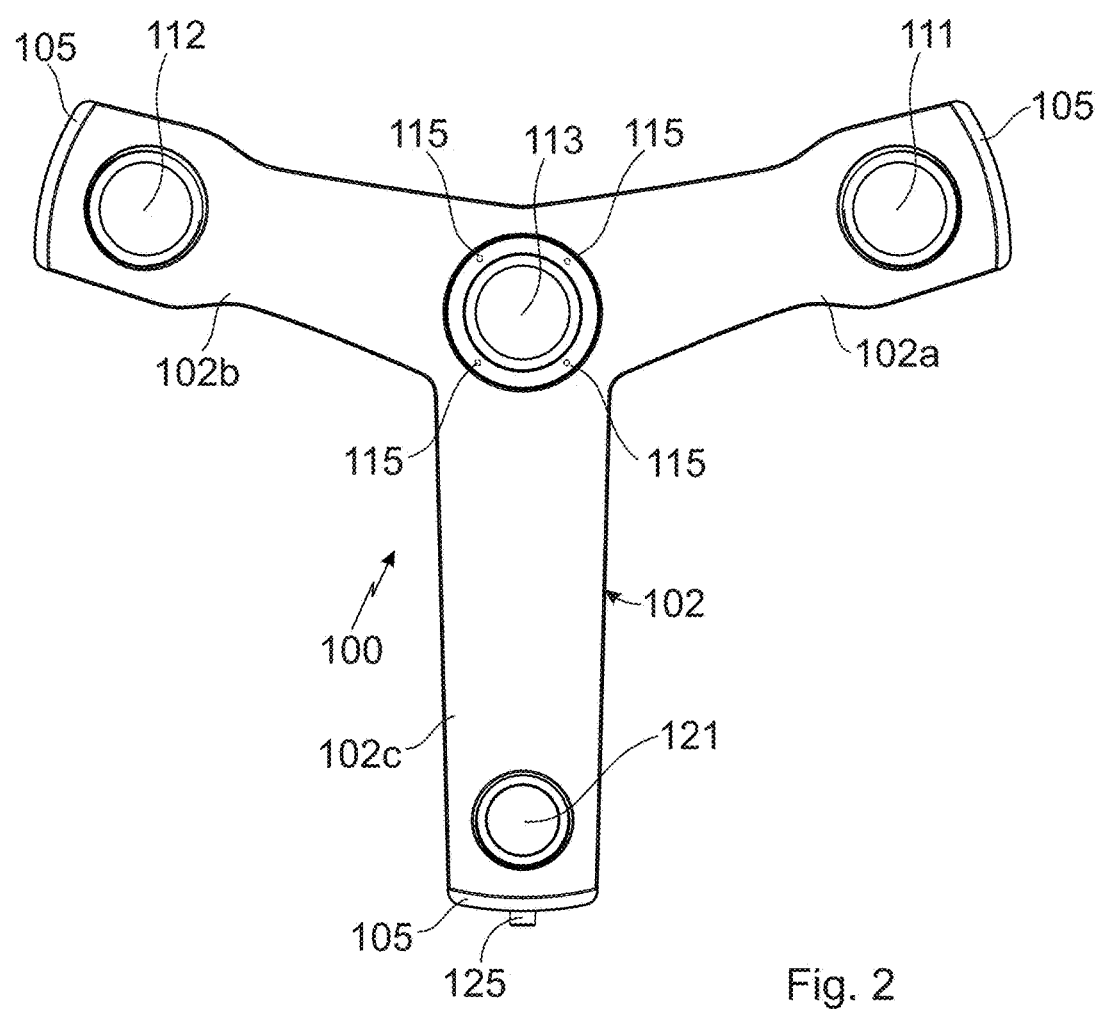
FIG. 2 shows a view of the front side of the hand-held scanner.
Figure 3:
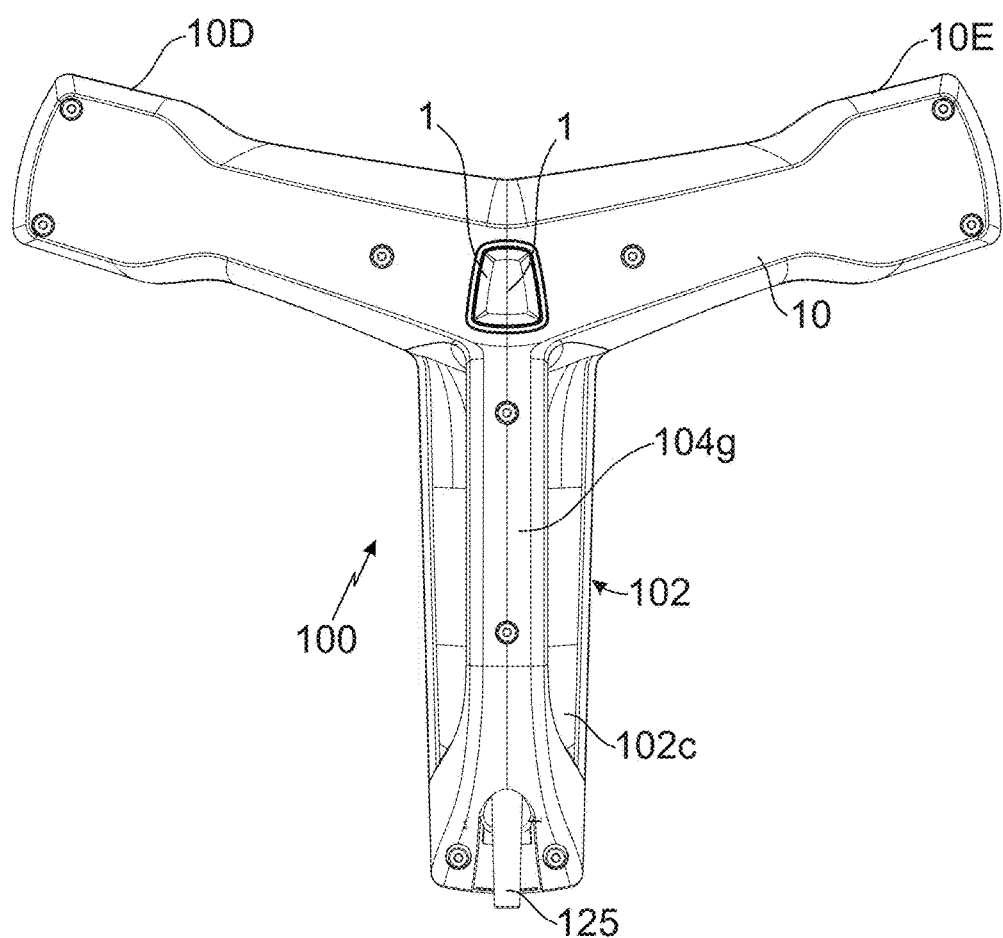
FIG. 3 shows a view of the reverse side of the hand-held scanner.
Figure 4:
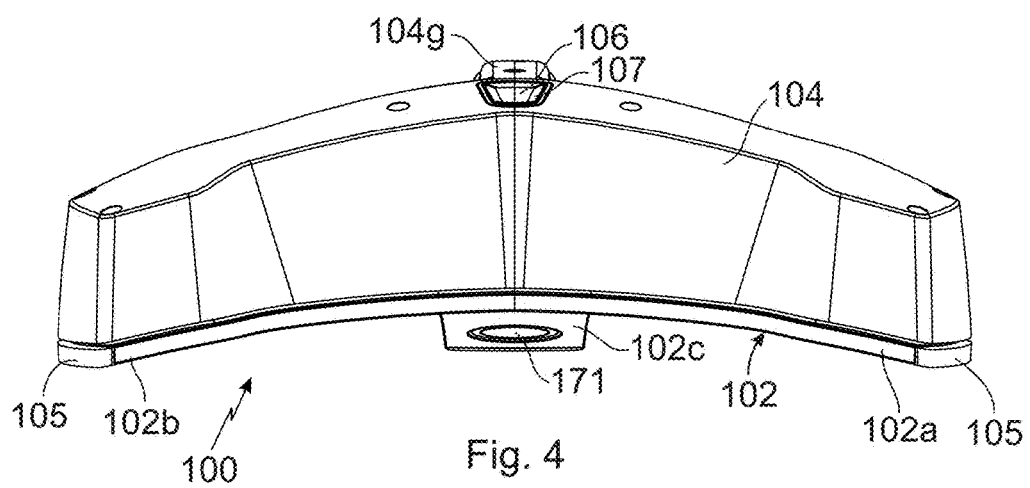
FIG. 4 shows a top view of the hand-held scanner from above.
Figure 5:
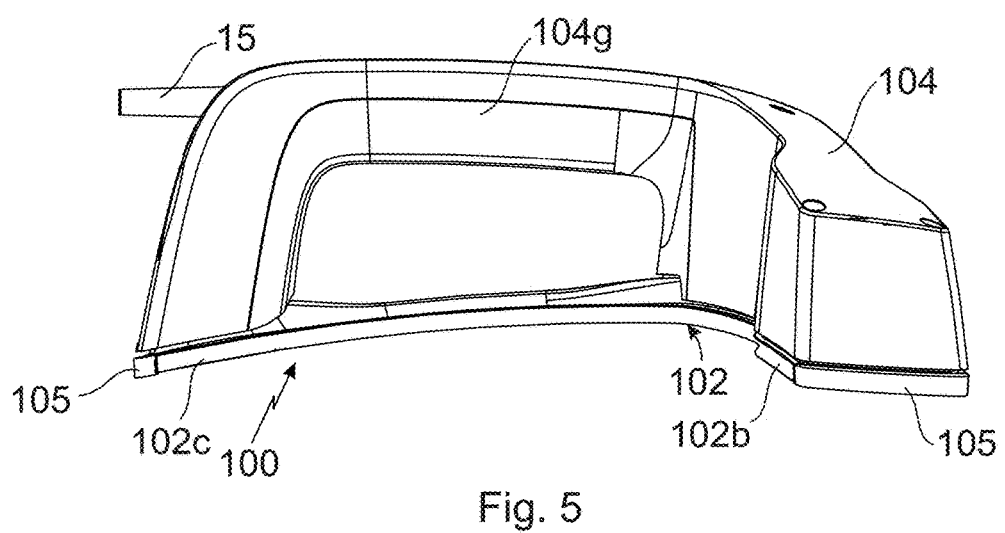
FIG. 5 shows a view of the hand-held scanner from the right side.
Figure 6:
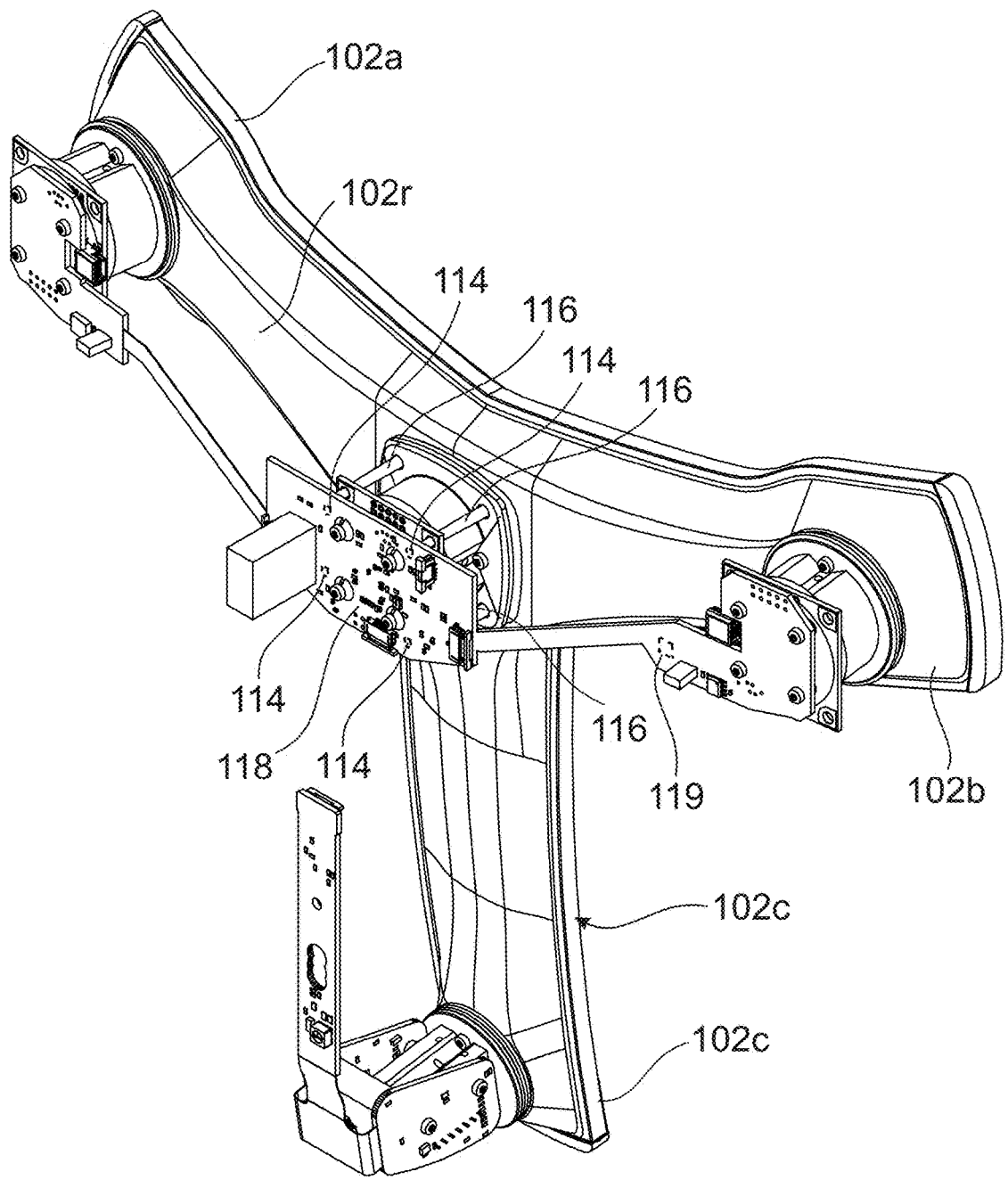
FIG. 6 shows a perspective view corresponding to FIG. 1 without a housing.

The detailed description explains embodiments of the invention, together with advantages and features, by way of example with reference to the drawings.

DETAILED DESCRIPTION

In one embodiment, the carrying structure is stable mechanically and thermally, defines the relative distances and the relative alignments of a camera and of a projector. The arrangement on a front side of the 3D measuring device faces on the environment, has the advantage that these distances and alignments are not changed by a change of the shape of a housing.

As used herein, the term "projector" is defined to generally refer to a device for producing a pattern. The generation of the pattern can take place by means of deflecting methods, such as generation by means of diffractive optical elements or micro-lenses (or single lasers), or by shading methods, for example the production by means of shutters, transparencies (as they would be used in a transparency projector) and other masks. The deflecting methods have the advantage of less light getting lost and consequently a higher intensity being available.

Depending on the number of assemblies provided for distance measuring, a corresponding number of arms of the carrying structure is provided, which protrude from a common center. The assemblies are provided in the area of the ends of the assigned arms. The assemblies may be arranged each on the reverse side of the carrying structure. Their respective optics is directed through an assigned aperture in the carrying structure, so that the assemblies face towards the environment from the front side. A housing covers the reverse side and forms the handle part.

In one embodiment, the carrying structure consists of a carbon-reinforced or a glass-fiber-reinforced matrix of synthetic material or ceramics (or of another material). The material provides for stability and a low weight and can, at the same time, be configured with viewing areas. A concave (spherical) curvature of the front side of the carrying structure does not only have constructive advantages, but it protects the optics of the assemblies provided for distance measuring, when the front surface of the 3D measuring device is placed on a work surface.

The projector produces the projected pattern, which may not be within the visible wavelength range. In one embodiment, the projected pattern has a wavelength in the infrared range. The two cameras have a corresponding sensitiveness in this wavelength range, while scattered light and other interferences may be filtered out in the visible wavelength range. A color or 2D camera can be provided as third camera for additional information, such as color for example. Such camera records images of the environment and of the object being scanned. In an embodiment where the camera captures color, the 3D-scan can be colored with the color information thus obtained.

The 3D measuring device generates multiple 3D scans of the same scene, from different positions. The 3D scans are registered in a joint coordinate system. For joining two overlapping 3D scans, recognizable structures are advantageous. Preferably, such recognizable structures are looked for and displayed continuously or, at least after the recording process. If, in a determined area, density is not at a desired level, further 3D scans of this area can be generated. A subdivision of the display used for representing a video image and the (thereto adjacent parts of the) three-dimensional point cloud helps to recognize, in which areas scan should still be generated.

In one embodiment, the 3D measuring device is designed as a portable scanner, i.e. it works at high speed and has little weight. It is, however, also possible to mount the 3D measuring device on a tripod (or on another stand), on a manually movable trolley (or another cart), or on an autonomously moving robot, i.e. that it is not carried by the user—optionally also by using another housing, for example without handle part. It should be appreciated that while embodiments herein describe the 3D measuring device as being hand-held, this is for exemplary purposes and the claimed invention should not be so limited. In other embodiments, the 3D measuring device may also be configured as a compact unit, which are stationary or mobile and, if appropriate, built together with other devices.

Referring to FIGS. 1-6, a 3D measuring device 100 is provided as portable part of a device for optically scanning and measuring an environment of the 3D measuring device 100 with objects O. As used herein, the side which faces the user of the 3D measuring device 100 shall be referred to as the reverse side, and the side which faces the environment as the front side. This definition extends to the components of the 3D measuring device 100. The 3D measuring device 100 is provided (on its front side) visibly with a carrying structure 102 with three arms 102a, 102b, 102c, which give the carrying structure 102 a T-shape or a Y-shape, i.e. a triangle arrangement. The area in which the three arms 102a, 102b, 102c are connected with each other, and from which the three arms 102a, 102b, 102c protrude, defines the center of the 3D measuring device 100. From the user's view, the carrying structure 102 is provided with a left arm 102a, a right arm 102b and a lower arm 102c. In the present case, the angle between the left arm 102a and the right arm 102b is, for example, approximately 150°+20°, between the left arm 102a and the lower arm 102c approximately 105°+10°. The lower arm 102c is, in most cases, somewhat longer than the two other arms 102a, 102b.

The carrying structure 102 preferably is configured from carbon-fiber-reinforced synthetic material (CFC). In another embodiment, the carrying structure 102 is made from carbon-fiber-reinforced ceramics or from glass-fiber-reinforced synthetic material. The material renders the carrying structure 102 mechanically and thermally stable and provides at the same time for a low weight. The measurement of the carrying structure 102 perpendicular to the arms 102a, 102b, 102c is considerably smaller (for example 5 to 15 mm) than the length of the arms 102a, 102b, 102c (for example 15 to 25 cm). The carrying structure 102 hence has a flat basic shape, in the present case at some sections of the arms 102a, 102b, 102c, with a reinforced back in the center. It is, however, preferably not configured to be plane, but to be curved. Such curvature of the carrying structure 102 is adapted to the curvature of a sphere having a radius of approximately 1 to 3 m. The front side (facing the object 0) of the carrying structure 102 is thereby configured to be concave, the reverse side to be convex. The curved shape of the carrying structure 102 is advantageous for the stability. The front side of the carrying structure 102 (and in the present case also the visible areas of the reverse side) is configured to be a viewing area, i.e. it is not provided with hiders, covers, cladding or other kinds of packaging. The preferred configuration from fiber-reinforced synthetic materials or ceramics is particularly suitable for this purpose.

On the reverse side of the carrying structure 102, a housing 104 is arranged, which is connected with the carrying structure 102 within the area of the ends of the three arms 102a, 102b, 102c in a floating way, by means of appropriate connecting means, for example by means of rubber rings and screws with a bit of clearance. Within the area of the left arm 102a and of the right arm 102b, the edge of the housing 104 extends into the immediate vicinity of the carrying structure 102, while the housing 104 extends from the center of the 3D measuring device 100 within the area of the lower arm 102c, at a distance to the carrying structure 102, forming a handle part 104g, bends off at the end of the handle part 104g and approaches the end of the lower arm 102c, where it is connected with it in a floating manner, and its edge extends into the immediate vicinity of the carrying structure 102. As far as, in some sections of the carrying structure 102, a reinforced back 102r is provided, such back 102r protrudes into the interior of the housing 104. The housing 104 acts as a hood.

The protective elements 105 may be attached to the housing 104 or to the carrying structure 102, particularly at the ends of the arms 102a, 102b, 102c, which protect from impacts and from damage resulting thereof. If not used, the 3D measuring device 100 can be put down with its front side to the bottom. Due to the concave curvature of the front side, it thus comes to lie on the ends of the arms 102a, 102b, 102c. Here, too, the protective elements 105 at the ends of the arms 102a, 102b, 102c are advantageous, since the 3D measuring device 100 comes to lie on them. Furthermore, naps from a soft material for example from rubber, which provide for a good contact with the user's hand, can optionally be attached to the housing 104, particularly to the handle part 104g.

On the reverse side of the housing 104, a control knob 106, by means of which at least optical scanning and measuring, i.e. the scanning process, can be started and stopped, is arranged in the center of the 3D measuring device 100. The control knob 106 may be multi-functional, for example by means of sequences which are structured in terms of time and/or by means of control devices which are distinguishable in terms of space, i.e. the control knob 106 cannot only be pressed in one direction, but be tilted in several directions in a distinguishable manner. In one embodiment, around the control knob 106 there are at least one status lamp 107. In one embodiment, there may be a plurality of status lamps 107. These status lamps 107 may be used to show the actual status of the 3D measuring device 100 and thus facilitate the operation thereof. The status lamps 107 can preferably show different colors (for example green or red) in order to distinguish several status'. The status lamps 107 may be light emitting diodes (LEDs).

On the carrying structure 102, spaced apart from each other at a defined distance, a first camera 111 is arranged on the left arm 102a (in the area of its end), and a second camera 112 is arranged on the right arm 102b (in the area of its end). The two cameras 111 and 112 are arranged on the reverse side of the carrying structure 102 and fixed thereto, wherein the carrying structure 102 is provided with one aperture each, through which the respective camera 111, 112 can view out of the front side of the carrying structure 102. The two cameras 111, 112 are preferably surrounded by the connecting means for the floating connection of the housing 104 with the carrying structure 102.

The alignments of the first camera 111 and of the second camera 112 to each other are adjusted or adjustable in such a way that the fields of view overlap and stereoscopic images of the objects O are possible. If the alignments are fixed, there is a desired overlapping range, depending on the application. With regard to precision, an overlapping range similar to the dimension of the 3D measuring device 100 would be favorable. Depending on environment situations, also a range of several decimeters or meters may be desired. In another embodiment, the alignments can be adjusted by the user, for example by pivoting the cameras 111 and 112 in opposite directions. The alignment can be known to the hand scanner 100 at any time, if the adjusting process of the user is tracked, or the alignment is initially at random (and unknown), and is then made known to the 3D measuring device 100, for example, by factory calibration.

The first camera 111 and the second camera 112 are preferably monochrome, i.e. sensitive to a narrow wavelength range, for example by being provided with corresponding filters, which then filter out other wavelength ranges, including scattered light. This narrow wavelength range may also be within the infrared range. In order to obtain color information on the objects O, the 3D measuring device 100 preferably is additionally provided with a 2D camera, such as color camera 113 which is preferably aligned symmetrically to the first camera 111 and to the second camera 112, and arranged in the center of the 3D measuring device 100, between those two. The 2D camera 113 is then sensitive in the visible wavelength range.

In order to illuminate the scene for the 2D camera, in the event of unfavorable lighting conditions, at least one, in the illustrated embodiment four (powerful) light-emitting diodes (LED) 114 are provided. One radiating element 115 each, by means of which the light of the light-emitting diode 114 is deflected in correspondence with the alignment of the 3D measuring device 100, is assigned to the light-emitting diodes 114. Such a radiating element 115 can, for example, be a lens or an appropriately configured end of a light guide. The (in the present case four) radiating elements 115 are arranged equally around the color camera 113. Each light-emitting diode 114 is connected with the assigned radiating element 115 by means of one light guide each. The light-emitting diodes 114 therefore can be structurally arranged at a control unit 118 of the 3D measuring device 100, such as by being fixed on a board thereof.

In order to later have a reference for the images recorded by the cameras 111, 112, 113, an inclinometer 119 may be provided. In one embodiment, the inclinometer 119 is an acceleration sensor (with one or several sensitive axes), which is manufactured in a manner known per se, as MEMS (micro-electro-mechanical system). As inclinometer 119, also other embodiments and combinations are possible. The data of the 3D measuring device 100 each have (as one component) a gravitation direction provided by the inclinometer 119.

Basically, from the images recorded by the first camera 111 and by the second camera 112, already three-dimensional data can be determined, i.e. 3D-scans of the objects O can be produced, for example by means of photogrammetry. The objects O, however, frequently have few structures and many smooth surfaces, so that generation of 3D-scans from the scattered light of the objects O is difficult.

A projector 121 is therefore provided, which is arranged at the lower arm 102c (in the area of its end), on the reverse side of the carrying structure 102 and fixed thereto, corresponding to the cameras 111, 112, 113, i.e. the carrying structure 102 is provided with an aperture, through which the projector 121 can view out of the front side of the carrying structure 102. The projector 121 is preferably surrounded by the connecting means for the floating connection of the housing 104 with the carrying structure 102. The projector 121, the first camera 111, and the second camera 112 are arranged in a triangle arrangement with respect to each other and aligned to the environment of the 3D measuring device 100. The projector 121 is aligned in correspondence with the two cameras 111 and 112. The relative alignment is preset or can be set by the user.

If the 3D measuring device 100 is laid down on its front side, i.e. with the front side to the bottom, on a storage area, the concave curvature of the front side provides for the cameras 111, 112, 113 and the projector 121 remaining spaced apart from the storage area, i.e. the respective lenses, for example, are protected from damage.

The cameras 111, 112, 113, the projector 121, the control knob 106, the status lamps 107, the light-emitting diodes 114 and the inclinometer 119 are connected with the common control unit 118, which is arranged inside the housing 104. This control unit 118 can be part of a control and evaluation device which is integrated in the housing. In an embodiment, the control unit 118 is connected with a standardized communication interface at the housing 104, the interface being configured for a wireless connection (for example Bluetooth, WLAN, DECT) as an emitting and receiving unit, or for a cable connection (for example USB, LAN), if appropriate also as a defined interface, such as that described in DE 10 2009 010 465 B3, the contents of which are incorporated by reference herein. The communication interface is connected with an external control and evaluation device 122 (as a further component of the device for optically scanning and measuring an environment of the 3D measuring device 100), by means of said wireless connection or connection by cable. In the present case, the communication interface is configured for a connection by cable, wherein a cable 125 is plugged into the housing 104, for example at the lower end of the handle part 104g, so that the cable 125 extends in prolongation of the handle part 104g.

The control and evaluation device 122 may include one or more processors 122a to carry out the methods for operating and controlling the 3D measuring device 100 and evaluating the measured data. The control and evaluation device 122 may be a portable computer (notebook) or a tablet (or smartphone) such as that shown in FIGS. 7 and 8, or any external or distal computer (e.g. in the web). The control and evaluation device 122 may also be configured in software for controlling the 3D measuring device 100 and for evaluating the measured data. However, the control and evaluation device 122 may be embodied in separate hardware, or it can be integrated into the 3D measuring device 100. The control and evaluation device 122 may also be a system of distributed components, at least one component integrated into the 3D measuring device 100 and one component externally. Accordingly, the processor(s) 122a for performing said methods may be embedded in the 3D measuring device 100 and/or in an external computer.

The projector 121 projects a pattern X, which it produces, for example by means of a diffractive optical element, on the objects to be scanned. The pattern X does not need to be encoded (that is to say single-valued), but it is preferably uncoded, for example periodically, that is to say multivalued. The multi-valuedness is resolved by the use of the two cameras 111 and 112, combined with the available, exact knowledge of the shape and direction of the pattern.

The uncoded pattern X is preferably a point pattern, comprising a regular arrangement of points in a grid. In the present invention, for example, approximately one hundred times one hundred points are projected at an angle of approximately 50° to a distance of approx. 0.5 m to 5 m. The pattern X can also be a line pattern or a combined pattern of points and lines, each of which is formed by tightly arranged light points.

There is a relationship between the point density, the distance between the projector 121 and the object O and the resolution that can be obtained with the produced pattern X. With diffractive pattern generation, the light of one source is distributed over the pattern. In that case the brightness of the pattern elements depends on the number of elements in the pattern when the total power of the light source is limited. Depending on the intensity of the light scattered from the objects and the intensity of background light it may be determined whether it is desirable to have fewer but brighter pattern elements. Fewer pattern elements mean the acquired point density decreases. It therefore seems helpful to be able to generate, in addition to pattern X, at least one other pattern. Depending on the generation of the patterns, a dynamic transition between the patterns and/or a spatial intermingling is possible, in order to use the desired pattern for the current situation. In an embodiment, the projector 121 may produce the two patterns offset to each other with respect to time or in another wavelength range or with different intensity. The other pattern may be a pattern which deviates from pattern X, such as an uncoded pattern. In the illustrated embodiment the pattern is a point pattern with a regular arrangement of points having another distance (grid length) to each other.

For reasons of energy efficiency and eye protection, the projector 121 produces the pattern X on the objects O only, when the cameras 111 and 112 (and if available 113) record images of the objects O which are provided with the pattern X. For this purpose, the two cameras 111, 112 and the projector 121 are synchronized, i.e. coordinated internally with each other, with regard to both, time and the pattern X used. Each recording process starts by the projector 121 producing the pattern X, similar to a flash in photography, and the cameras 111 and 112 (and, if available 113) following with their records, more particularly their pairs of records (frames), i.e. one image each from each of the two cameras 111, 112. The recording process can comprise one single frame (shot), or a sequence of a plurality of frames (video). Such a shot or such a video is triggered by means of the control knob 106. After processing of the data, each frame then constitutes a 3D-scan, i.e. a point cloud in the three-dimensional space, in relative coordinates of the 3D measuring device 100.

The data furnished by the 3D measuring device 100 are processed in the control and evaluation device 122, i.e. the 3D scans are generated from the frames. The 3D scans in turn are joined, i.e. registered in a joint coordinate system. For registering, the known methods can be used, i.e. natural or artificial targets (i.e. recognizable structures) can be localized and identified for example in overlapping areas of two 3D scans, in order to determine the assignment of the two 3D scans by means of corresponding pairs. A whole scene is thus gradually registered by the 3D measuring device 100. The control and evaluation device 122 is provided with a display 130 (display device), which is integrated or connected externally.

Figure 7:
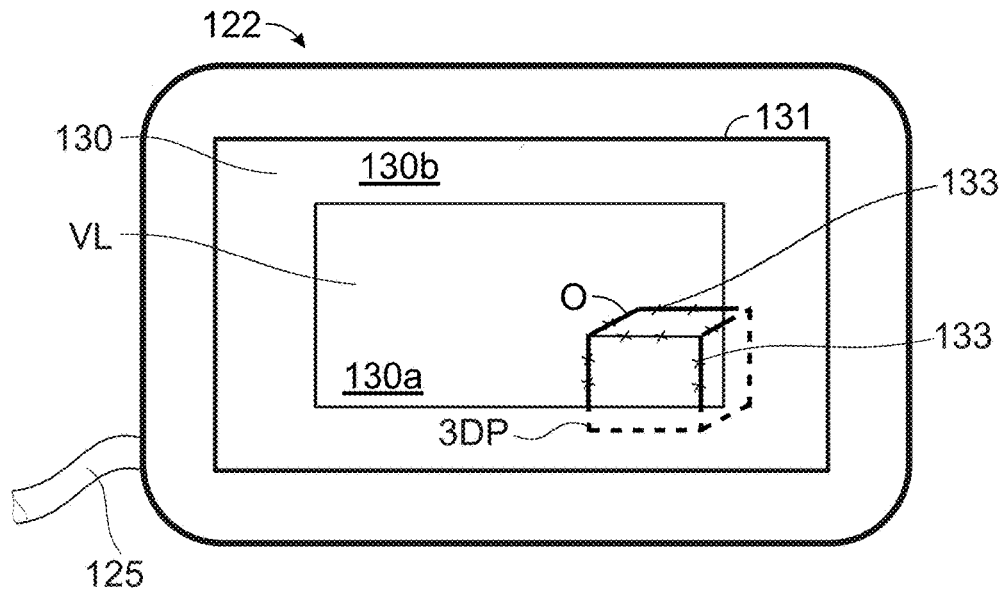
FIG. 7 shows a representation of the control and evaluation device with a display.
Figure 8:
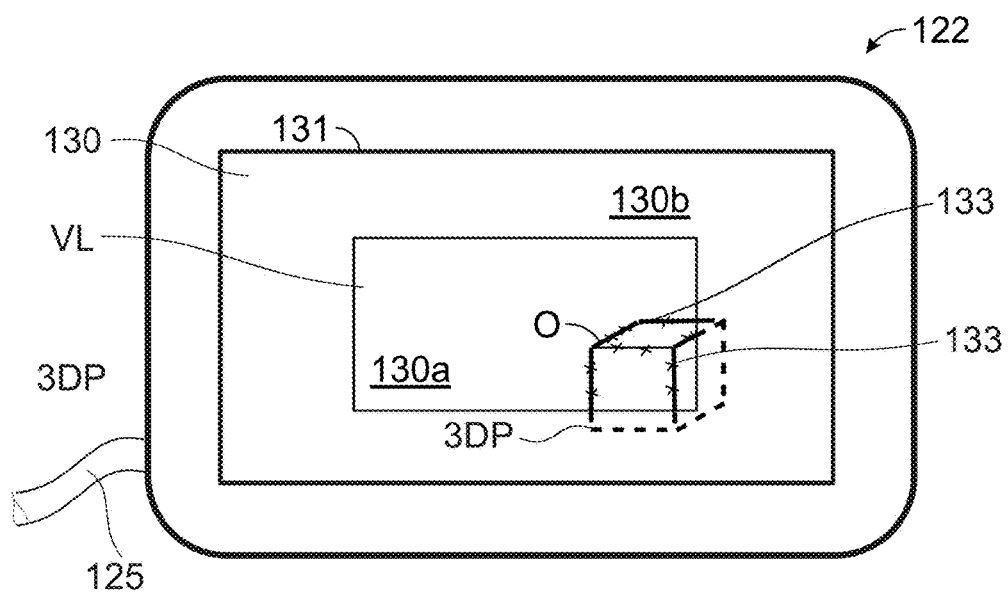
FIG. 8 shows a representation corresponding to FIG. 7, with a smaller scale of the video image.

One embodiment of the display 130 shown in FIG. 7 illustrates a subdivided image or subdivided screen. In this embodiment, the display 130 is divided into a first display part 130a and a second display part 130b. In the present embodiment, the first display part 130a is a (rectangular) central part of the display 130, and the second display part 130b is a peripheral area around the first display part 130a. In another embodiment, the two display parts may be columns. In the embodiment illustrated in FIGS. 7-9, the first display part 130a is shown as having a rectangular shape, however this is for exemplary purposes and the claimed invention should not be so limited. In other embodiments, the first display part 130a may have other shapes, including but not limited to circular, square, trapezoid (FIG. 10), trapezium, parallelogram, oval, triangular, or a polygon having any number of sides. In one embodiment, the shape of the first display part 130a is user defined or selectable.

In the first display part 130a a video live image VL is displayed, such as that captured by 2D camera 113 for example. In the second display part 130b, an image of the latest 3D scan (or a plurality of 3D scans that have been registered) is displayed as at least part of a view of the three-dimensional point cloud 3DP. The size of the first display part 130a may be variable, and the second display part 130b is arranged in the area between the first display part 130a and the border 131 of the display 130. As video live image VL changes, such as when the user moves the device 100, the image of the three-dimensional point cloud 3DP changes correspondingly to reflect the change in position and orientation of the device 100.

Figure 9:
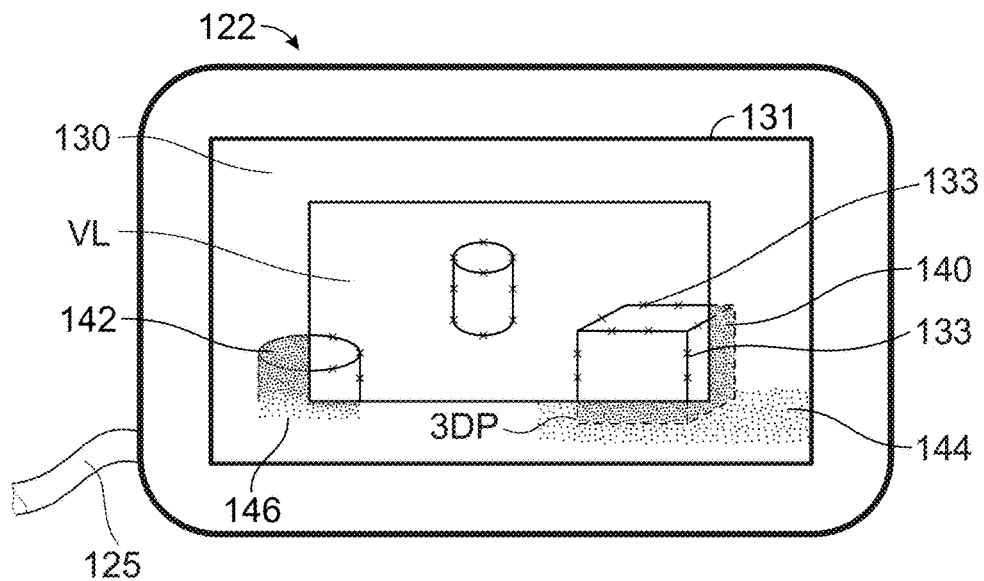
FIG. 9 shows a representation of the control and evaluation device with display in accordance with another embodiment.
Figure 10:
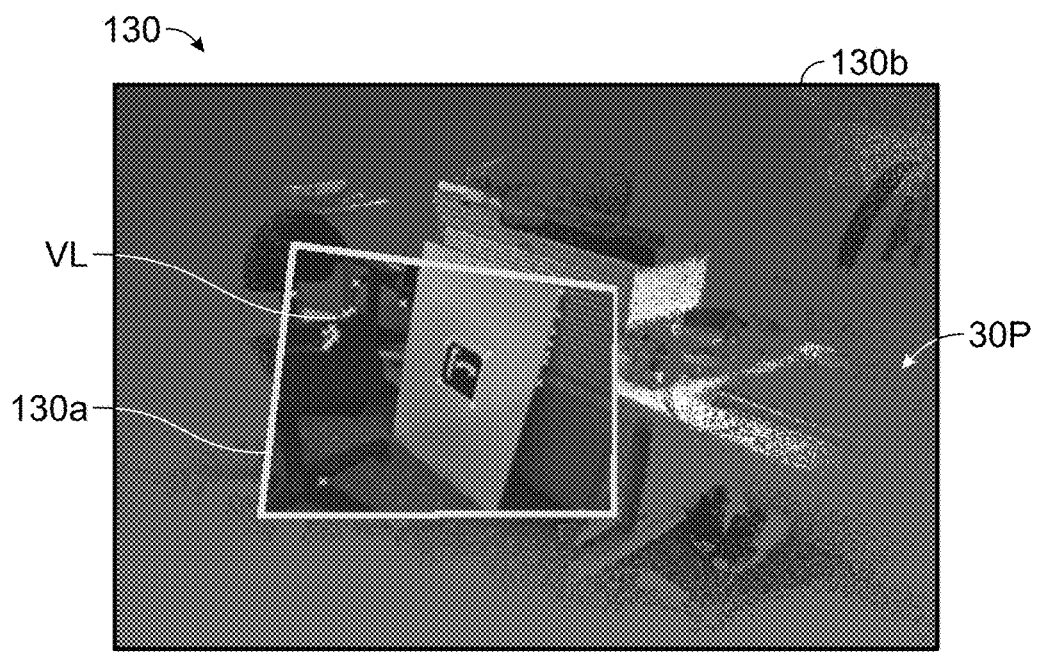
FIG. 10 is a computer generated image of the display of FIG. 7 or FIG. 9.

It should be appreciated that the placement of the image of the three-dimensional point cloud 3DP around the periphery of the video live image VL provides advantages in allowing the user to easily see where additional scanning may be required without taking their eyes off of the display 130. In addition it may be desirable for the user to determine if the computational alignment of the current camera position to the already acquired 3D data is within a desired specification. If the alignment is outside of specification, it would be noticed as discontinuities at the border between the image and the three-dimensional point cloud 3DP. Referring now to FIG. 9, it can be seen that during a scanning operation some areas, such as areas 140, 142 have a high density of points that allow for a representation of an object at a desired accuracy level. The user will be able to observe that other areas, such as areas 144, 146 have lower point densities. The user may then determine whether additional scanning needs to be performed. For example, area 144 may be a table top where a generally low density of points may be acceptable. The user may determine that other areas, such as area 146 for example, may require additional scanning since the object has not been completely captured. FIG. 10 illustrates a computer generated image of a scanning process, it should be appreciated that the image of the three-dimensional point cloud 3DP is variable and continuously changes, which could make it difficult for a user to determine when additional scanning is needed. Thus the video live image VL and the image of the three-dimensional point cloud 3DP cooperate to guide the user during the scanning process.

The image acquired by the camera 113 is a two-dimensional (2D) image of the scene. A 2D image that is rendered into a three-dimensional view will typically include a pin-cushion-shaped or barrel-shaped distortion depending on the type of optical lens used in the camera. Generally, where the field of view (FOV) of the camera 113 is small (e.g. about 40 degrees), the distortion is not readily apparent to the user. Similarly, the image of the three-dimensional point cloud data may appear distorted depending on how the image is processed for the display. The point cloud data 3DP may be viewed as a planar view where the image is obtained in the native coordinate system of the scanner (e.g. a spherical coordinate system) and mapped onto a plane. In a planar view, straight lines appear to be curved. Further, the image near the center-top and center-bottom edges (e.g. the poles) may be distorted relative to a line extending along the midpoint of the image (e.g. the equator). Further, there may also be distortions created by trying to represent a spherical surface on a rectangular grid (similar to the Mercator projection problem).

It should be appreciated that it is desired to have the images within the first display part 130a appear to be similar to that in the second display part 130b to provide a continuous and seamless image experience for the user. If the image of three-dimensional point cloud 3DP is significantly distorted, it may make it difficult for the user to determine which areas could use additional scanning. Since the planar image of the point cloud data 3DP could be distorted relative to the 2D camera image, one or more processing steps may be performed on the image generated from the point cloud data 3DP. In one embodiment, the field of view (FOV) of the second display part 130b is limited so that only the central portion of the planar image is shown. In other words, the image is truncated or cropped to remove the highly distorted portions of the image. Where the FOV is small (e.g. less 120 degrees), the distortion is limited and the planar view of the point cloud data 3DP will appear as desired to the user. In one embodiment, the planar view is processed to scale and shift the planar image to provide to match the camera 113 image in the first display part 130a.

In another embodiment, the three-dimensional point cloud data 3DP is processed to generate a panoramic image. As used herein, the term panoramic refers to a display in which angular movement is possible about a point in space (generally the location of the user). A panoramic view does not incur the distortions at the poles as is the case with a planar view. The panoramic view may be a spherical panorama that includes 360 degrees in the azimuth direction and +/−45 degrees in the zenith. In one embodiment the spherical panoramic view may be only a portion of a sphere.

In another embodiment, the point cloud data 3DP may be processed to generate a 3D display. A 3D display refers to a display in which provision is made to enable not only rotation about a fixed point, but also translational movement from point to point in space. This provides advantages in allowing the user to move about the environment and provide a continuous and seamless display between the first display part 130a and the second display part 130b.

In one embodiment, the video live image VL in the first display part 130a and the image of the three-dimensional point cloud 3DP in the second display part 130b match together seamlessly and continuously (with respect to the displayed contents). A part of the three-dimensional point cloud 3DP is first selected (by the control and evaluation device 122) in such a way, as it is regarded from the perspective of the 2D camera 113 or at least from a position aligned with the 2D camera 113. Then, the selected part of the three-dimensional point cloud 3DP is selected in such a way that it adjoins continuously the video live image VL. In other words, the displayed image of the three-dimensional point cloud 3DP becomes a continuation of the video live image VL for the areas beyond the field of view of the 2D camera 113 on the left, on the right, top and bottom relative to the field of view of the 2D camera). As discussed above, the selected portion of the three-dimensional point cloud 3DP may be processed to reduce or eliminate distortions. In other embodiments, the representation may correspond to the representation of a fish-eye lens, but preferably it is undistorted. The part of the three-dimensional point cloud 3DP which is located in the area occupied by the first display part 130a, in other words the portion beneath or hidden by the video live image VL, is not displayed.

It should be appreciated that the density of the points in the three-dimensional point cloud 3DP in the area where the first display part 130a is located will not be visible to the user. Normally, the video live image VL is displayed using the natural coloring. However, in order to indicate the density of the points in the area covered/behind by the video live image VL, the coloring of the video live image VL may be changed artificially such as by overlaying for example. In this embodiment, the artificial color (and, if appropriate, the intensity) used for representing the artificially colored video live image VL corresponds to the density of the points. For example, a green coloring to the video live image VL may indicate a (sufficiently) high density while a yellow coloring may be used to indicate a medium or low point density (e.g. areas which still the scan data can be improved). In another embodiment, the distant-depending precision of the data points could be displayed using this color-coding To support the registration of the 3D scans, flags or marks 133 (FIG. 7 and FIG. 8) may be inserted in the first display part 130a to indicate structures (i.e. possible targets) recognized by the control and evaluation device 122. The marks 133 may be a symbol, such as a small "x" or "+" for example. The recognizable structures can be points, corners, edges or textures of objects. The recognizable structures may be found by the latest 3D scan or the video live image VL being subjected to the beginning of the registering process (i.e. to the localization of targets). The use of the latest video live image VL provides advantages in that the registration process does not have to be performed as frequently. If the marks 133 have a high density, it is considered to be a successful registration of the 3D scans. If, however, a lower density of the marks 133 is recognized, additional 3D scans may be performed using a relatively slow movement of the 3D measuring device 100. By slowing the movement of the device 100 during the scan, additional or higher density points may be acquired. Correspondingly, the density of the marks 133 may be used as a qualitative measure for the success of the registration. Similarly, the density of the points of the three-dimensional point cloud 3DP may be used to indicate a successful scan. As discussed above, the density of points in the scan may be represented by the artificial coloring of the video live image VL.

The movement of the 3D measuring device 100 and processing of the captured frames may also be performed by a tracking function, i.e. the 3D measuring device 100 tracks the relative movement of its environment with the methods used during tracking. If tracking gets lost, for example, if the 3D measuring device 100 has been moved too fast, there is a simple possibility of reassuming tracking. In this embodiment, the video live image VL as it is provided by the 2D camera 113 and the last video still image from tracking provided by it may be represented adjacent to each other in a side by side arrangement on the display 130 for the user. The user may then move the 3D measuring device 100 until the two video images coincide.

In one embodiment, the 3D measuring device 100 may be controlled based on movements of the device 100. These movements or gestures by the user can also be used for changing operating parameters of the 3D measuring device 100, such as controlling the representation of the video image VL or of the three-dimensional point cloud 3DP for example. In one embodiment, the scale of representation of the video image VL and/or of the three-dimensional point cloud 3DP on the display 130 may depend on the speed and/or acceleration of the movement of the 3D measuring device 100. As used herein, the term "scale" means the ratio between the size (either linear dimension or area) of the first display part 130a and the size of the complete display 130, being denoted as a percentage.

A small field of view of the 2D camera 113 is assigned to a small scale. In the present embodiment with a subdivided display 130 with a central first display part 130a showing the video live image VL, this first display part 130a then may be of smaller size than in the standard case, and the second display part 130b (about the periphery of the first display part 130a) shows a bigger part of the three-dimensional point cloud 3DP. A larger field of view is assigned to a large scale. In one embodiment, the video live image VL may fill the whole display 130.

In the event of high speed movement of the 3D measuring device 100 is detected (such as with an accelerometer for example), the scale of the representation may be decreased or configured smaller than with low speeds and vice versa. Similarly, this may apply to accelerations of the movement of the 3D measuring device 100. For example, the scale of the displayed image is decreased or reduced in the case of positive accelerations, and the scale is increased in the case of negative accelerations. As used herein, the term "positive acceleration" means that the acceleration value of the 3D measuring device 100 increases from the beginning to the end of the movement. Further, as used herein the term "negative acceleration" means that the acceleration value of the 3D measuring device 100 decreases from the beginning to the end of the movement. The scale may also depend on a component (vector direction) of the speed and/or acceleration of the movement of the 3D measuring device 100, for example on a component which is arranged perpendicular (e.g. vertical relative to the ground) or parallel (e.g. horizontal relative to the ground) to the alignment of the 3D measuring device 100. If the scale is based on a component of the movement, parallel to the alignment (i.e. in the direction of the alignment), the scale can also be made dependent on the change of an average distance to objects O from the 3D measuring device 100, such as when the user moved the 3D measuring device towards or away from the objects O.

In some embodiments, the change of the scale due to movement, a standstill or stopping movement of the 3D measuring device 100 or where the movement speed value is less than a threshold is used to trigger a recording of a sequence of still images of the camera 113. In one embodiment, this sequence of still images are acquired with a low dynamic range. These images may be captured at low dynamic range within the sequence to generate a high dynamic range image therefrom. As used herein, the term "low dynamic range" means a plurality of images acquired of the same scene or field of view where each image has a different exposure time or is exposed to a different illumination intensity than the other images in the sequence of images. As used herein, the term "high dynamic range" means the generation of a single image through the merger of the plurality of images acquired at low dynamic range.

In some embodiments, the direction of gravity may be defined at the beginning of the registration process by a defined movement of the 3D measuring device 100. This defined movement is carried out by the user by moving the device 100 in a vertical upward and downward movement relative to the ground for example. In other embodiments, the direction of gravity may be determined by statistically analyzing a set of movements performed during the registration process. A plane may be averaged from the coordinates of the positions taken by the device 100 while recording process along a path of movement through space. It is assumed that the averaged plane is located horizontally in space, meaning that the direction of gravity is perpendicular to it. This provides advantages in avoiding the use of the inclinometer 119 for determining the direction of gravity.

The evaluation of the coordinates of the positions may also be used for determining the kind of scene and, if appropriate, to offer different representations or operating possibilities. By moving the 3D measuring device 100 along a path around a center location (with an alignment of the 3D measuring device 100 oriented towards the interior), allows the 3D measuring device 100 to determine an image of a single object O (object-centered image). Similarly, moving the 3D measuring device 100 along a path that orients the device 100 towards the outside or away from a central location (and particularly longer straight sections of the path of movements) allows the 3D measuring device 100 to determine that the data acquired is for an image of a room. Thus, where it is determined that a room is being scanned, an image of a floor plan (top view) may be inserted into the display 130.

While the invention has been described in detail in connection with only a limited number of embodiments, it should be readily understood that the invention is not limited to such disclosed embodiments. Rather, the invention can be modified to incorporate any number of variations, alterations, substitutions or equivalent arrangements not heretofore described, but which are commensurate with the spirit and scope of the invention. Additionally, while various embodiments of the invention have been described, it is to be understood that aspects of the invention may include only some of the described embodiments. Accordingly, the invention is not to be seen as limited by the foregoing description, but is only limited by the scope of the appended claims.

The invention claimed is:

1. A method for optically scanning and measuring an environment of a handheld scanner comprising:
   recording images of the environment with cameras included in the handheld scanner, the images including a video image of the environment recorded with a first of the cameras;
   processing data provided by the handheld scanner to a control and evaluation device to obtain a three-dimensional (3D) point cloud;
   representing the video image and the 3D point cloud on a display of the control and evaluation device, the representation of at least one of the video image and 3D point cloud being determined by one of a speed or an acceleration of the handheld scanner;
   wherein, in the step of representing the video image on a display of the control and evaluation device, a scale of the representation of the video image is determined by at least one of the speed or the acceleration of the handheld scanner, the scale being a ratio of a size of the representation of the video image to a size of the display;
   wherein the scale of the representation of the video image is smaller for a first speed movement of the handheld scanner than for a second speed movement of the handheld scanner, the first speed being larger than the second speed; and
   displaying the resulting image.

2. The method of claim 1, wherein the scale of representation of the video image is based at least in part on a vector direction of the first speed or second speed.

3. The method of claim 2, wherein the scale of representation of the video image is based on the vector direction is perpendicular to an alignment of the handheld scanner.

4. The method of claim 2, wherein the scale of representation of the video image is based on the vector direction is parallel to the alignment of the handheld scanner.

5. The method of claim 4, wherein the scale of representation is further based in part on the change of an average distance to an object being scanned.

6. The method of claim 1, further comprising acquiring a sequence of still images with at least one of the cameras in response to the first speed or the second speed being less than a threshold.

7. The method of claim 6, wherein the first speed is a standstill or stop of movement.

8. A method for optically scanning and measuring an environment of a handheld scanner comprising:
   recording images of the environment with cameras included in the handheld scanner, the images including a video image of the environment recorded with a first of the cameras;
   processing data provided by the handheld scanner to a control and evaluation device to obtain a three-dimensional (3D) point cloud;
   representing the video image and the 3D point cloud on a display of the control and evaluation device, wherein the video image is displayed on a first part of the display and the 3D point cloud is displayed on a second part of the display, wherein at least a portion of the first part is adjacent to a portion of the second part; and
   defining a direction of gravity by moving the handheld scanner.

9. The method of claim 8, wherein the handheld scanner does not have a inclinometer.

10. The method of claim 8, wherein the defining of the direction of gravity is based on vertical upward and downward movement relative to the ground.

11. The method of claim 8, wherein the defining of the direction of gravity is based at least in part by statistically analyzing a set of movements performed during a registration process.

12. The method of claim 11, wherein a plane is defined by averaging the coordinates of positions handheld scanner while recording a path of movement through space.

13. The method of claim 12, wherein the plane is defined as being horizontally in space and the direction of gravity is defined as being perpendicular to the plane.

14. A method for optically scanning and measuring an environment of a handheld scanner comprising:
   recording images of the environment with cameras included in the handheld scanner, the images including a video image of the environment recorded with a first of the cameras;
   processing data provided by the handheld scanner to a control and evaluation device to obtain a three-dimensional (3D) point cloud;
   representing the video image and the 3D point cloud on a display of the control and evaluation device, wherein the video image is displayed on a first part of the display and the 3D point cloud is displayed on a second part of the display, wherein at least a portion of the first part is adjacent to a portion of the second part;
   moving the handheld scanner along a path; and
   determining a scene from the path.

15. The method of claim 14, wherein the path is around a center location.

16. The method of claim 15, further comprising determining the scene is a single object to be scanned.

17. The method of claim 14, further comprising determining the path orients the handheld scanner away from a central location.

18. The method of claim 17, further comprising determining the scene is a room.

19. The method of claim 18, further comprising displaying an image of a floor plan on a display with the video image and the 3D point cloud.

\* \* \* \* \*